US008429400B2

(12) United States Patent
Khalid et al.

(10) Patent No.: US 8,429,400 B2
(45) Date of Patent: Apr. 23, 2013

(54) VPN PROCESSING VIA SERVICE INSERTION ARCHITECTURE

(75) Inventors: Mohamed Khalid, Cary, NC (US); Warren S. Wainner, Potomac Falls, VA (US); Aamer Akhter, Cary, NC (US); Paul Quinn, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1147 days.

(21) Appl. No.: 11/766,309

(22) Filed: Jun. 21, 2007

(65) Prior Publication Data
US 2008/0320303 A1   Dec. 25, 2008

(51) Int. Cl.
   *H04L 29/06* (2006.01)
(52) U.S. Cl.
   USPC ........... 713/163; 713/153; 380/285; 380/286; 707/713; 707/759
(58) Field of Classification Search ............... 713/189, 713/161–163; 726/15–22; 707/149
See application file for complete search history.

(56) References Cited

U.S. PATENT DOCUMENTS

| | | | |
|---|---|---|---|
| 5,748,736 A | 5/1998 | Mittra | |
| 6,523,022 B1* | 2/2003 | Hobbs | 1/1 |
| 7,171,556 B2 | 1/2007 | Balaz et al. | |
| 7,185,076 B1* | 2/2007 | Novaes et al. | 709/223 |
| 7,234,058 B1* | 6/2007 | Baugher et al. | 713/163 |
| 7,302,564 B2* | 11/2007 | Berlin | 713/151 |
| 7,421,578 B1* | 9/2008 | Huang et al. | 713/163 |
| 7,522,599 B1* | 4/2009 | Aggarwal et al. | 370/390 |
| 7,627,755 B2* | 12/2009 | Ahonen et al. | 713/163 |
| 7,664,724 B2* | 2/2010 | Lucovsky et al. | 707/781 |
| 7,774,837 B2* | 8/2010 | McAlister | 726/15 |
| 7,900,250 B1* | 3/2011 | Fedyk et al. | 726/15 |
| 7,921,288 B1* | 4/2011 | Hildebrand | 713/166 |
| 8,009,829 B2* | 8/2011 | Jueneman et al. | 380/28 |
| 8,194,859 B2* | 6/2012 | Wingert et al. | 380/286 |
| 2002/0167935 A1* | 11/2002 | Nabkel et al. | 370/352 |
| 2003/0226013 A1* | 12/2003 | Dutertre | 713/163 |
| 2004/0083363 A1* | 4/2004 | Hengeveld et al. | 713/163 |
| 2004/0152439 A1* | 8/2004 | Kimura et al. | 455/403 |
| 2006/0112400 A1* | 5/2006 | Zhang et al. | 719/328 |
| 2007/0143600 A1* | 6/2007 | Kellil et al. | 713/163 |
| 2007/0186281 A1* | 8/2007 | McAlister | 726/14 |
| 2007/0198836 A1* | 8/2007 | Fedyk et al. | 713/171 |
| 2008/0080509 A1* | 4/2008 | Khanna et al. | 370/392 |
| 2008/0080517 A1* | 4/2008 | Roy et al. | 370/395.5 |
| 2008/0256592 A1* | 10/2008 | Schnell et al. | 726/1 |
| 2008/0256646 A1* | 10/2008 | Strom et al. | 726/29 |
| 2008/0298592 A1* | 12/2008 | Khalid et al. | 380/278 |
| 2009/0271612 A1* | 10/2009 | Liu | 713/151 |

OTHER PUBLICATIONS

Salgarrelli L, Efficient authentication and key distribution in wireless IP networks, Dec. 2003, IEEE, vol. 10, pp. 5-7.*
U.S. Appl. No. 11/655,363, filed Jan. 19, 2007, Paul Quinn, et al.
U.S. Appl. No. 11/400,695, filed Apr. 7, 2006, Paul Quinn, et al.
Baugher, M., et al. "The Group Domain of Interpretation" RFC 3547 obtained from http://www.ietf.org/rfc/rfc3547.txt, Jul. 2003, 45 pages.

* cited by examiner

*Primary Examiner* — Nathan Flynn
*Assistant Examiner* — Viral Lakhia
(74) *Attorney, Agent, or Firm* — Fish & Richardson P.C.

(57) ABSTRACT

In one embodiment, a method can include: (i) sending a request to join a group to a service broker; (ii) receiving from the service broker a list of key servers servicing the group; and (iii) sending registration information to a selected one of the key servers in the list.

20 Claims, 6 Drawing Sheets

VPN PROCESSING VIA SERVICE INSERTION ARCHITECTURE

TECHNICAL FIELD

The present disclosure relates generally to a methodology for discovery and support of virtual private network (VPN) processing, such as group encrypted transport (GET) VPN processing.

BACKGROUND

Group encrypted transport (GET) architectures may involve group members being "bootstrapped" with group information with respective key server Internet Key Exchange (IKE) address identities. Further, as the size of a GET-enabled VPN grows, additional key servers may be required. Current architectures can include each group member being updated with a current set of available key servers for each group. Also, each key server may be bootstrapped with an entire set of key server identities for every group to which the key server expects to provide policy and perform key distribution.

The introduction of a new key server may be synchronized such that all the key server relationships for a group may be completed. This prevents a group member from registering with a key server that has only a partial association with an active set of key servers. Typical operational practices to accomplish this synchronization may use either manual configuration techniques, or centralized management techniques to push configuration to the group member and/or key server devices. However, these conventional techniques have drawbacks related to deployment, particularly in distributed or highly scaled VPN structures.

DESCRIPTION OF EXAMPLE EMBODIMENTS

Overview

In one embodiment, a method can include: (i) sending a request to join a group to a service broker; (ii) receiving from the service broker a list of key servers servicing the group; and (iii) sending registration information to a selected one of the key servers in the list.

In one embodiment, a method can include: (i) sending registration information, group membership, and capabilities, to a service broker; (ii) receiving a key server membership list from the service broker; and (iii) establishing a cooperative relationship with another key server using the key server membership list.

In one embodiment, a method can include: (a) when configuring a key server: (i) receiving registration information, group membership, and capabilities; and (ii) sending a key server membership list to the key server; and (b) when configuring a group member: (i) receiving a request from the group member; and (ii) sending a list of key servers servicing a particular group to the group member.

Example Embodiments

Particular embodiments can accommodate inserting group encrypted transport (GET) enabled devices in virtual private networks (VPN) and/or dynamic group VPN (DGVPN) based on an active set of group members and key servers, and aiding in service allocation based on resources. Generally, dynamically establishing key server and group member relationships can be supported. In particular embodiments, additional functionality can be applied to group domain of interpretation (GDOI) specifications, as found in IETF (Internet Engineering Task Force) RFC 3547. All relevant portions of RFC 3547 are incorporated by reference herein.

Figure 1:
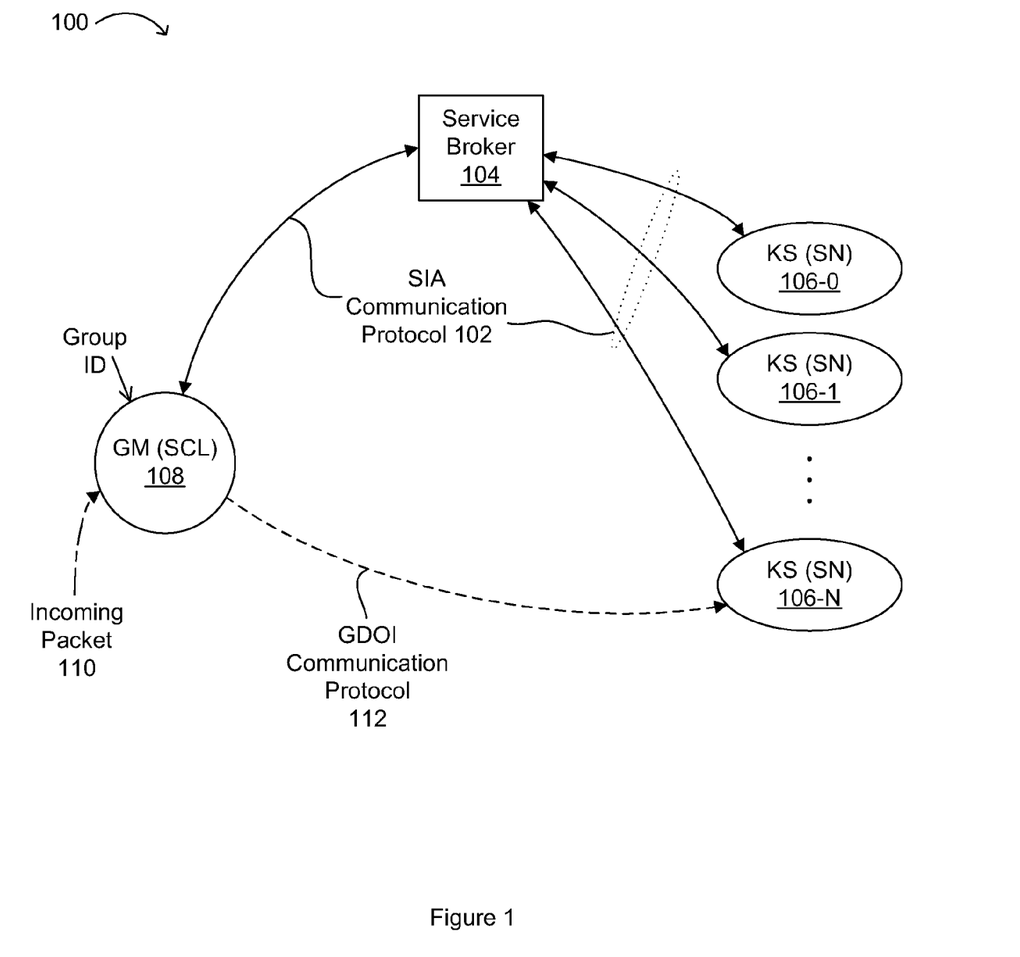
FIG. 1 illustrates an example group member, service broker, and key server arrangement.

Referring now to FIG. 1, an example group member, service broker, and key server arrangement is shown and indicated by the general reference character 100. A group member (GM) may act as a service classifier (SCL) in a service insertion architecture (SIA) enabled system. For example, a group member may be a router or set of routers connected to a multiprotocol label switching (MPLS) VPN, such as for enterprise-wide communication between distributed sites. In addition, GM (SCL) 108 may provide a first entry point for incoming packet 110. GM (SCL) 108 may participate via the control plane (e.g., SIA communication protocol 102) with service broker 104. GM (SCL) 108 may also participate via the control plane (e.g., using GDOI communication protocol 112, MPLS, or any other suitable communication transport) with key servers acting as service nodes.

Service broker 104 can generally handle control plane traffic from/to service nodes and service classifiers. In an SIA architecture, service nodes can contact a service broker (e.g., 104) to register services, and receive from the service broker, information about domain-wide services, and service header to service mapping. The service node can perform an actual service, and participate in both the control plane (e.g., with a service directory and/or a service broker), and the data plane (e.g., with the service classifier) in a typical SIA architecture.

As shown in FIG. 1, key servers (KS) can be configured to act as service nodes (SN), such as KS (SN) 106-0, KS (SN) 106-1, . . . , KS (SN) 106-N, and may communicate via SIA communication protocol 102 with service broker 104. In particular embodiments, GM (SCL) 108 may select one key server (e.g., KS (SN) 106-N) from which to obtain policy and encryption keys. Accordingly, group members may authenticate and download policy/keys, and then utilize those keys for communication with other members of that group (e.g., as identified by Group ID).

Key servers can include routers, which can include use of internetwork operating systems (IOS), and may create encryption keys, manage security policies, manage the lifetime of such keys, and periodically push key material and/or policies out to appropriate nodes. The latter may accommodate periodically changing keys for enhanced security purposes. By utilizing key servers and group members in this fashion, static configuration is typically not required. Rather, dynamic establishment of key server and group member relationships can be accommodated in particular embodiments.

Figure 2:
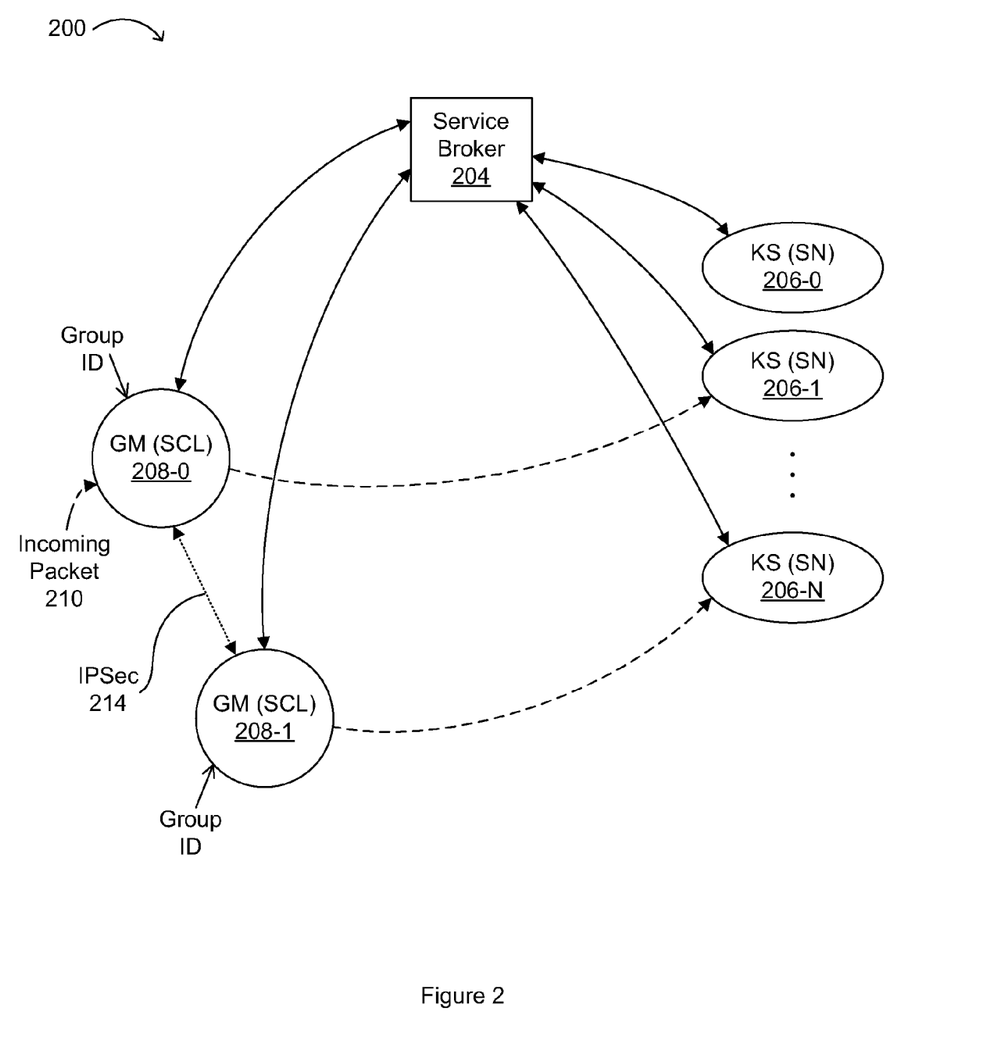
FIG. 2 illustrates an example multiple group member, service broker, and key server arrangement.

Referring now to FIG. 2, an example multiple group member, service broker, and key server arrangement is shown and indicated by the general reference character 200. GM (SCL) 208-0 may boot-up, request services for a specific Group ID with service broker 204 (e.g., using remote authentication dial in user service (RADIUS)), and service broker 204 may supply GM (SCL) 208-0 with the key server list to join a group identified by Group ID. Similarly, GM (SCL) 208-1 may also join the same group (e.g., Group ID). In this fashion, multiple group members can be established by acting as service classifiers, and communicating with a service broker. Alternatively, in some cases, a group member may provide identification, and then may be assigned a group based on policy.

In order to obtain policy and encryption keys, GM (SCL) 208-0 may send a registration (e.g., using GDOI) to a selected key server (e.g., KS (SN) 206-1) in the set of key servers including KS (SN) 206-0, KS (SN) 206-1, . . . , KS (SN) 206-N. Similarly, GM (SCL) 208-1 may send a registration to KS (SN) 206-N. Once each of GM (SCL) 208-0 and 208-1 have been authenticated by a key server, established as group members in the group affiliated with Group ID, and have obtained the same policy and keys from selected key servers, the group members can communicate among themselves in a data plane using any suitable form of encryption. For example, GM (SCL) 208-0 can receive incoming packet 210, and may communicate with GM (SCL) 208-1 using Internet protocol security (IPSec) 214. In this fashion, common sharing of a VPN can be enabled in particular embodiments. Further, any other group member can request services from SB 204 for a given Group ID, and may authenticate with an appropriate key server. Also, a group member can establish data plane encryption with any other group member authorized as a member of the Group ID.

Figure 3:
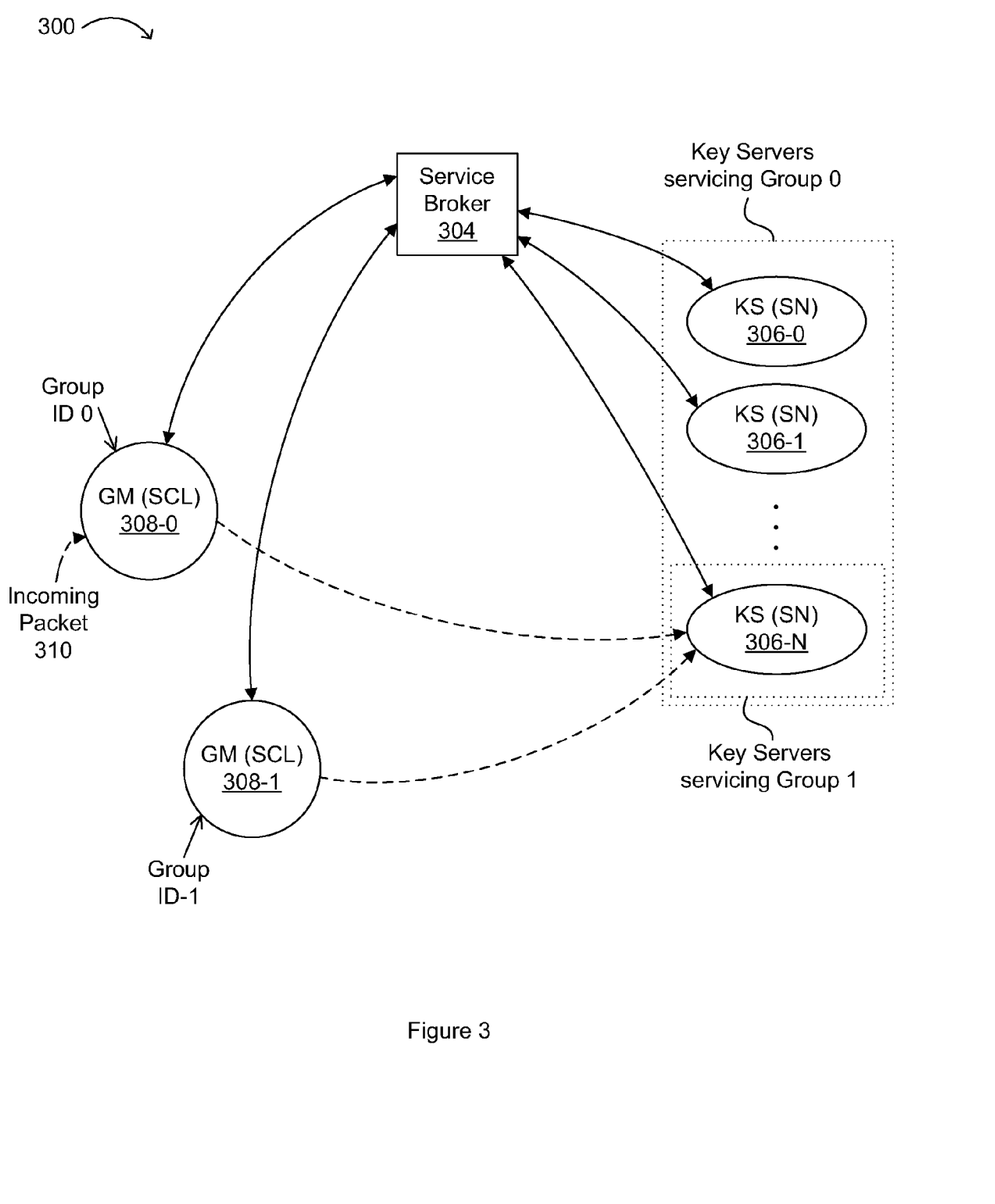
FIG. 3 illustrates an example key server servicing multiple groups.

Referring now to FIG. 3, an example key server servicing multiple groups is shown and indicated by the general reference character 300. Key servers servicing Group 0 can include KS (SN) 306-0, KS (SN) 306-1, . . . , KS (SN) 306-N. GM (SCL) 308-0 can be configured for Group ID 0, may receive incoming packet 310, and may receive policy and key information from KS (SN) 306-N. In addition, GM (SCL) 308-1 can be configured for Group ID 1, and may receive policy and key information from KS (SN) 306-N, the only key server servicing Group 1 in this particular example. In this fashion, key servers may service more than one group. Further, KS (SN) 306-N can request key server participants from service broker 304. Service broker 304 can then respond with the key server list representing Group 1, for which KS (SN) 306-N may be the exclusive representative service node. Also, KS (SN) 306-N may not negotiate a synchronization of Group 1 with any of the other KS (SN) 306-0, KS (SN) 306-1, . . . , KS (SN) 306-N-1, since no other such key server may represent Group 1.

Figure 4:
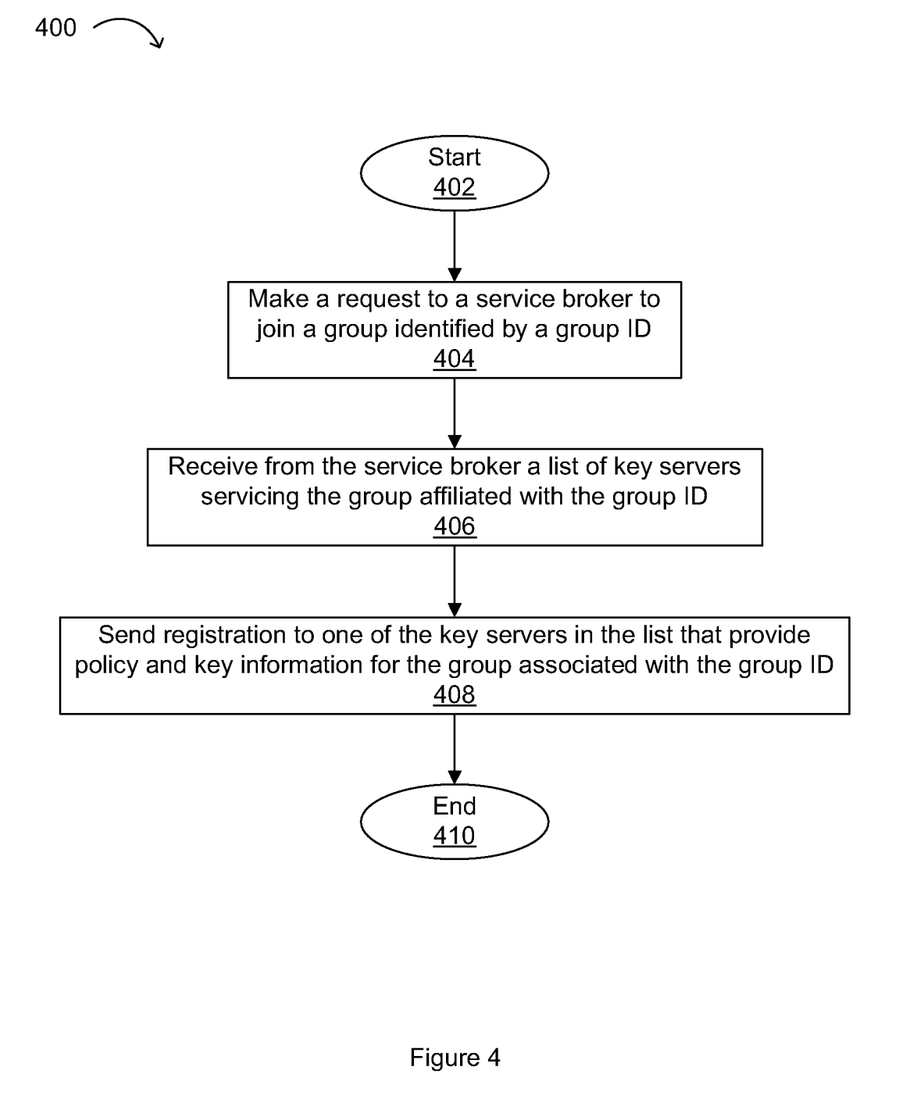
FIG. 4 illustrates a flow diagram for an example method of configuring a group member.

Referring now to FIG. 4, a flow diagram for an example method of configuring a group member is shown and indicated by the general reference character 400. The flow can begin (402), and a request can be made to a service broker to join a group identified by a Group ID (404). For example, the request can be made from a group member acting as a service classifier. Thus, the group member can be configured with a group ID or namespace to which the group member can join. Further, the group name can map directly to a typical SIA service namespace.

Next, the group member can receive from the service broker a list of key servers servicing the group affiliated with the Group ID (406). Thus, the group member acting as a service classifier can make a request to the service broker and, based on the Group ID tag, the service broker can send a list of key servers servicing the group affiliated with the Group ID tag. In addition, the group member can belong to multiple groups. Further, the list of key servers supplied by the service broker can be ordered in order of preference to facilitate selection of a key server for policy and key retrieval. For example, such an ordered list may be determined by load considerations, based on data localized to the group member, and/or based on other "meta" information, as discussed below.

The group member can then register using traditional GET processes, or a GDOI communication protocol, to one of the key servers providing policy and key information for the group associated with the Group ID tag (408), and the flow can complete (410). In particular embodiments, any suitable communication transport can be utilized between group members and key servers. In this fashion, a group member acting as a service classifier can be dynamically configured with the list of key servers using a service broker and a key server acting as a service node.

Figure 5:
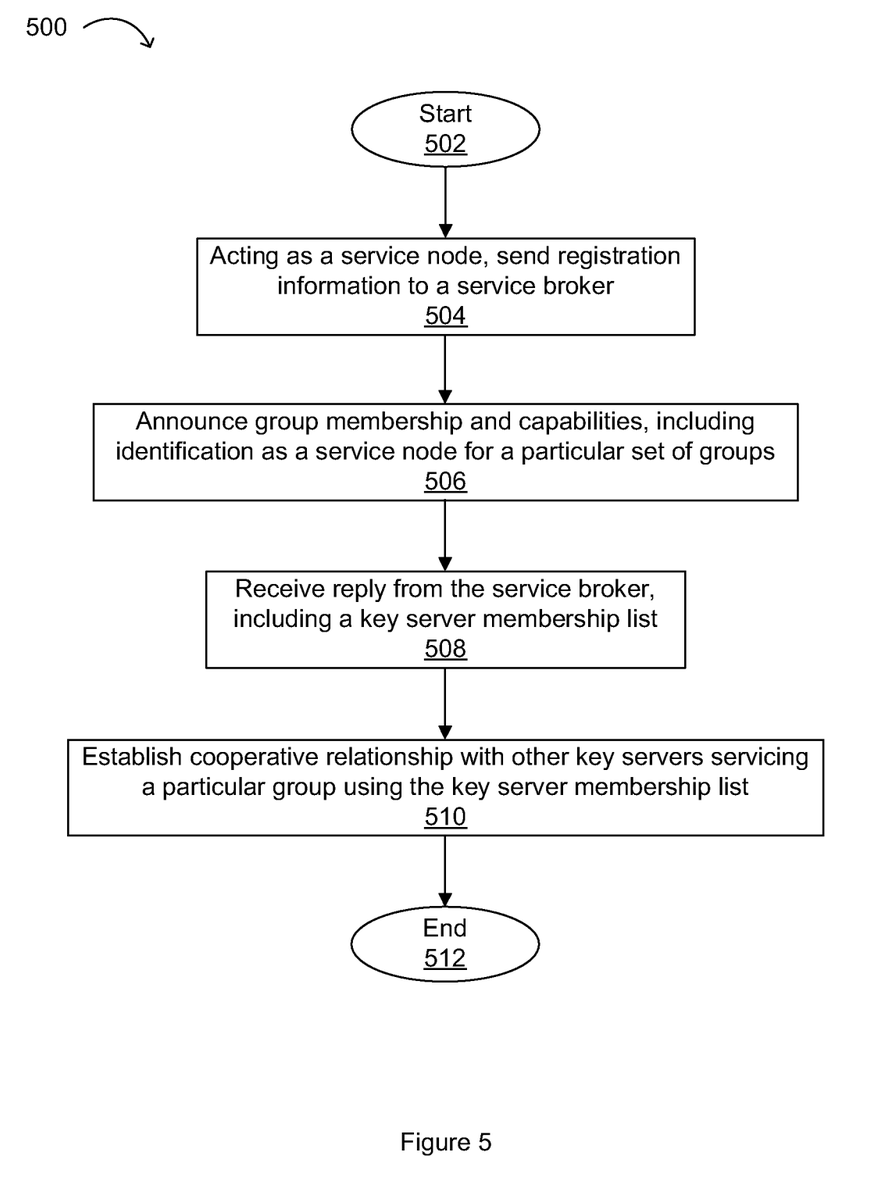
FIG. 5 illustrates a flow diagram for an example method of adding a key server to a group.

Referring now to FIG. 5, a flow diagram for an example method of adding a key server to a group is shown and indicated by the general reference character 500. The flow can begin (502) and a key server, acting as a service node, can register to a service broker (504). The key server can also announce group membership and capabilities, including identification as a service node for a particular set of groups (506). This announcement may simply be a group identity announcement based on an abstract name for a security group, and may be similar to a generic service announcement. Thus, content provided by the key server may include identification as a service node for a particular set of GET-enabled, or other VPN, groups.

The key server may be authenticated with the service broker to ensure that a rogue service node is not announcing "bogus" service capabilities. The SIA control plane may also provide encryption in some embodiments. In addition to group membership, the key server can also send meta information, or "metadata" to aid group members in the selection of a key server from which to obtain policy and key information. Such meta information can include: (i) a number of sustainable Internet Key Exchange (IKE) connections (e.g., a number of serviceable group members); (ii) geographic location; and/or (iii) multicast capability (e.g., attachment to a multicast network). Also in particular embodiments, a key server may receive policies that are included in an SIA once authenticated or otherwise registered with a service broker.

The service broker can acknowledge the key server announcement with a reply including a key server membership list of other key servers that have successfully authenticated and announced services for that group (508). Such behavior may be akin to the service table updates used for traditional SIA services, but with a returned key server membership list instead of a service table and chain list. Accordingly, as new key servers join a group, particular embodiments can allow for updating each chain of key servers dynamically in the group.

The key server can use the key server membership list to establish a cooperative relationship (e.g., COOP protocol) with other key servers servicing the group (510), until the process is completed in 512. The COOP protocol can utilize existing mechanisms to exchange group information and synchronize encryption state. For example, IKE can be utilized for policy, key, and encryption communication between key servers.

Figure 6:
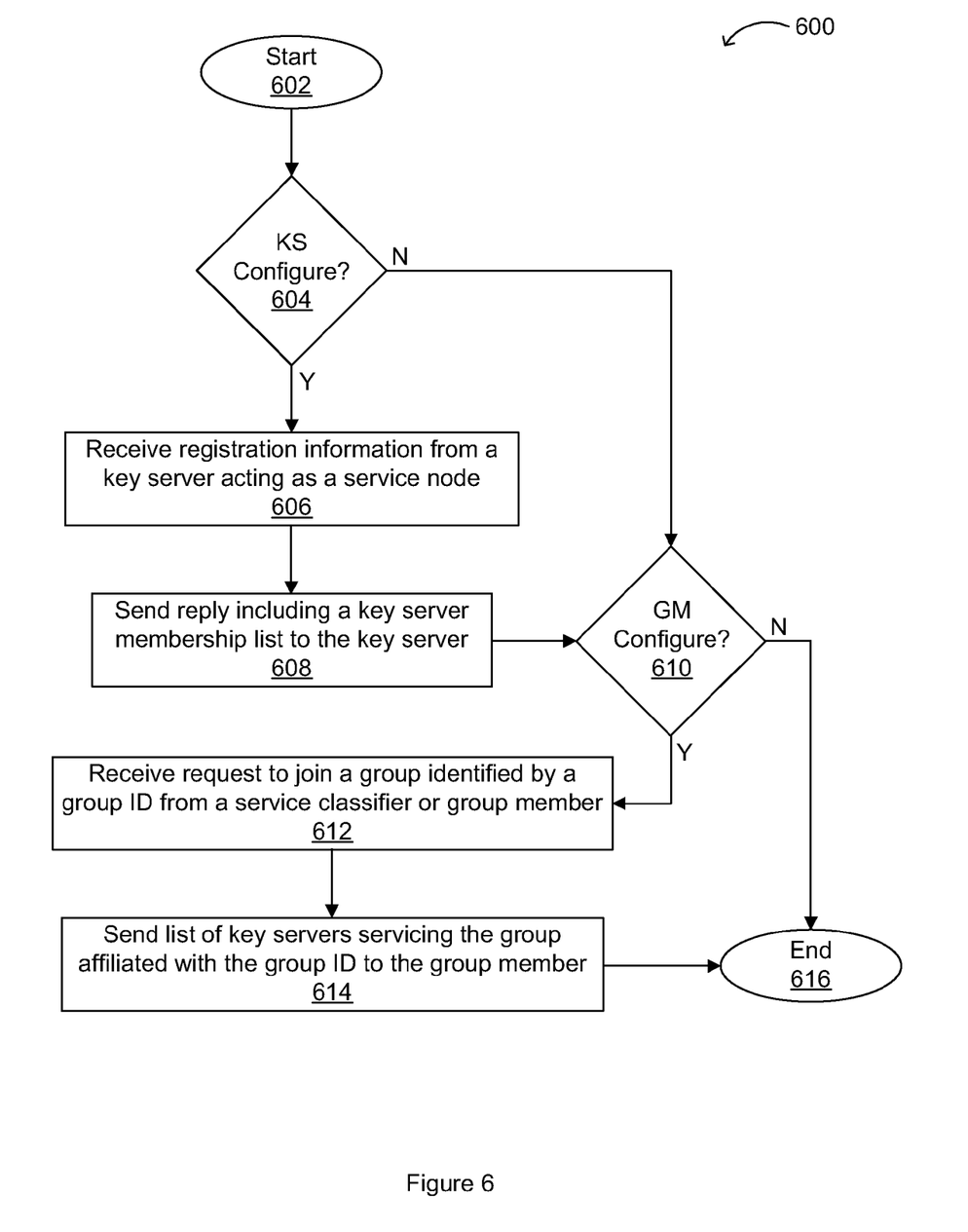
FIG. 6 illustrates a flow diagram for an example method of managing group member and key server relationships.

Referring now to FIG. 6, a flow diagram for an example method of managing group member and key server relationships is shown and indicated by the general reference character 600. The flow can begin (602), and if a key server is to be configured (604), registration information can be received from a key server acting as a service node (606). A reply can be sent from the service broker to a key server, where the reply can include a key server membership list (608). If a group member is to be configured (610), a request to join a group identified by a Group ID can be received from the group member acting as a service classifier (612). A list of key servers servicing the group affiliated with the Group ID can then be sent to the group member (614), and the flow can complete (616).

In particular embodiments, if a key server becomes unavailable, the remaining key servers servicing the group can announce to the service broker the loss of connectivity to the group's key server set. Subsequent requests from the group member can then receive an updated list of key servers. Further, if a key server becomes overloaded, the overloaded key server can send an update to the service broker to indicate a capacity limit has been reached, and the service broker can take the overloaded key server out of the resource pool.

Thus in particular embodiments, SIA techniques can be utilized to solve key server discovery mechanism and synchronous bootstrap problems. The introduction of service classifier, service broker, and service node functions to a VPN security framework can simplify configuration complexity and challenges associated with bringing up the system. In particular embodiments, the SIA framework can allow the key servers to be introduced independently to the network while minimizing disruption to the existing VPN security infrastructure.

One example of an alternative approach utilizing particular embodiments can include application of the SIA for GET-enabled encryption with end-user hosts or client applications utilizing the group encrypted transport model described herein. Clients (e.g., those representing group members of a group represented by a Group ID) may request services from a service broker, and be directed to a set of key server that represents the list of key servers managing encryption polices and keys for the group of clients that wish to communicate. The clients may authenticate with a selected key server in the list serving the Group ID and obtain group encryption policies and keys. For example, clients of the same Group ID can then communicate with one another via an IPSec encrypted data plane using group security associations.

Although the description has been described with respect to particular embodiments thereof, these particular embodiments are merely illustrative, and not restrictive. For example, while specific key server, service node, group member, service classifier, and service broker arrangements have been described, other system arrangements can be supported in particular embodiments. Also, while GET VPN security has been described with respect to particular examples, other types of security, encryption, and/or other forms of VPN processing, can be accommodated in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that what is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
   sending a request from a network device in a network to a service broker device in a service insertion architecture (SIA) to join a first secure group that is identifiable by a group identification (ID) in the request, the SIA comprising the service broker device configured to handle control traffic for managing secure groups in the network, one or more network devices configured to exchange data traffic as members of the secure groups, and one or more key servers configured to generate policy and encryption keys for the secure groups;
   receiving, at the network device and from the service broker device, a list of key servers configured for servicing the first secure group, the list including an ordering of the key servers based on meta information associated with the key servers, wherein key servers are included in the list based on being authenticated by the service broker device;
   selecting, using the network device, a key server from the list based on the meta information;
   sending, using the network device, registration information to the selected key server to join the first secure group;
   receiving, at the network device and from the selected key server, policy and encryption keys for the first secure group responsive to the network device being authenticated by the selected key server and established as a group member of the first secure group based on the registration information; and
   establishing encrypted communication, by the network device and based on the policy and encryption keys received from the selected key server, with one or more group members of the first secure group.

2. The method of claim 1, further comprising:
   communicating, using the network device acting as a first group member and based on the established encrypted communication, with a second group member via a data plane, wherein the data plane is configured to support encrypted versions of data packets.

3. The method of claim 2, further comprising:
   configuring data plane communication between the first and the second group members to use Internet Protocol Security (IPSec).

4. The method of claim 3, further comprising inserting the first group member into a virtual private network (VPN) that includes the second group member.

5. The method of claim 1, wherein sending the request to the service broker device and receiving the list of key servers from the service broker device comprise using a control plane communication protocol associated with the SIA.

6. The method of claim 1, wherein sending the registration information to the selected key server comprises using a group domain of interpretation (GDOI) communication protocol.

7. The method of claim 1, wherein the key servers are configured for performing operations comprising:
   creating encryption keys for associated secure groups,
   managing security policies for the associated secure groups,
   managing lifetime of the encryption keys,
   periodically sending at least one of the encryption keys and the security policies to group members of the respective secure groups, and
   periodically changing the encryption keys for enhanced security purposes.

8. The method of claim 1, wherein the key servers do not participate in encrypted communications that are established between group members of the associated secure groups.

9. The method of claim 1, wherein the meta information is selected from the group consisting of load at the key servers, data localized to the network device sending the request, a number of group members serviceable by each key server, geographic location of the key servers and multicast capability of the key servers.

10. A method, comprising:
    sending registration information from a first key server in a network to a network device that is configured as a service broker to handle control traffic for managing secure groups in the network, wherein the first key server is configured to act as one of a plurality of service nodes in a service insertion architecture (SIA) that comprises the service broker, at least one service classifier, and the plurality of service nodes, the registration information including identification of a secure group for which the first key server is configured to act as a service node, the registration information further providing meta information based on which group members of the secure group select a key server from which to obtain policy and key information;

announcing to the network, by the first key server, group membership and capabilities of the first key server associated with the secure group, the announcing including identifying the secure group for which the first key server is configured to act as a service node;

in response to sending the registration information and announcing the group membership, receiving at the first key server a key server membership list from the service broker, wherein the key server membership list indicates one or more other key servers that are configured for servicing the secure group, the key server membership list received based on the key server being authenticated by the service broker;

establishing, using the first key server, a cooperative relationship with a second key server indicated by the key server membership list; and exchanging, by the first key server with the second key server, information on the secure group based on the established cooperative relationship, the exchanging including synchronizing encryption states.

11. The method of claim 10, wherein establishing the cooperative relationship comprises using an Internet key exchange (IKE).

12. The method of claim 10, wherein sending the registration information and the receiving the key server membership list comprise using a control plane communication protocol of the SIA.

13. The method of claim 10, wherein the meta information comprises a number of sustainable IKE connections that the first key server is capable of handling.

14. The method of claim 10, wherein the meta information comprises a geographic location associated with the first key server.

15. The method of claim 10, wherein the meta information comprises an indication of multicast capability of the first key server.

16. The method of claim 10, wherein the meta information comprises an update of a status of the cooperative relationship from the first key server to each key server in the membership list.

17. The method of claim 10, further comprising:

receiving, at the first key server and from the second key server, information indicating that the second key server is inoperable or at limited capacity; and sending an announcement from the first key server to the service broker indicating that the second key server is inoperable or at limited capacity.

18. The method of claim 10, wherein the first and second key servers are configured for performing operations comprising:

creating encryption keys for associated secure groups, managing security policies for the associated secure groups, managing lifetime of the encryption keys, periodically sending at least one of the encryption keys and the security policies to group members of the respective secure groups, and periodically changing the encryption keys for enhanced security purposes.

19. The method of claim 10, wherein the first and second key servers do not participate in encrypted communications that are established between group members of the associated secure groups.

20. A system comprising:

a first network device configured to act as a service classifier in a service insertion architecture (SIA), the SIA comprising a second network device configured as a service broker to handle control traffic for managing secure groups in a network that includes a first secure group with the first network device a group member of the first secure group, the SIA further including one or more key servers configured as service nodes to generate policy and encryption keys for the secure groups; and a processor operable to process instructions that are configured to cause the processor to perform operations comprising:

sending a request from the network device to the service broker to join the first secure group that is identifiable by a group ID in the request;

receiving, at the network device and from the service broker device, a list of key servers configured for servicing the first secure group, the list including an ordering of the key servers based on meta information associated with the key servers, wherein key servers are included in the list based on being authenticated by the service broker device;

selecting, using the network device, a key server from the list based on the meta information;

sending, using the network device, registration information to the selected key server to join the first secure group;

receiving, at the network device and from the selected key server, policy and encryption keys for the first secure group responsive to the network device being authenticated by the selected key server and established as a group member of the first secure group based on the registration information; and establishing encrypted communication, by the network device and based on the policy and encryption keys received from the selected key server, with one or more group members of the first secure group.

* * * * *